US006736903B2

(12) United States Patent
Minazzoli

(10) Patent No.: US 6,736,903 B2
(45) Date of Patent: May 18, 2004

(54) METHOD AND APPARATUS FOR PRODUCING A WORK PRODUCT

(75) Inventor: John J. Minazzoli, Fowler, CA (US)

(73) Assignee: Sunshine Raisin Corporation, Fowler, CA (US)

(*) Notice: Subject to any disclaimer, the term of this patent is extended or adjusted under 35 U.S.C. 154(b) by 133 days.

(21) Appl. No.: 09/840,734

(22) Filed: Apr. 23, 2001

(65) Prior Publication Data

US 2002/0153333 A1 Oct. 24, 2002

(51) Int. Cl.[7] ............................... C13J 1/06; B01J 3/00; C13D 3/00; B01D 15/00; C13F 1/06

(52) U.S. Cl. .............................. 127/46.1; 127/2; 127/9; 127/42; 127/43; 127/53; 127/55; 127/56

(58) Field of Search ............................ 127/2, 9, 42, 43, 127/46.1, 53, 55, 56

(56) References Cited

U.S. PATENT DOCUMENTS 2,830,603 A 4/1958 Vagim ......................... 134/57
5,593,598 A 1/1997 McGinness et al. ........ 210/748
6,387,186 B1 * 5/2002 Reisig et al. ................. 127/55
6,406,546 B1 * 6/2002 Donovan et al. ............. 127/55
6,454,946 B1 * 9/2002 DeFrees ..................... 210/653
2001/0054420 A1 * 12/2001 Reisig et al. ................. 127/55

* cited by examiner

*Primary Examiner*—C. Melissa Koslow
*Assistant Examiner*—Patricia L. Hailey
(74) *Attorney, Agent, or Firm*—Worrel & Worrel

(57) ABSTRACT

A method for producing a work product including the steps of receiving a first fluid composed of a liquid, a target substance and at least one residual substance; passing the first fluid through a first work station for separating the residual substance from the first fluid to produce a secondary fluid substantially composed of the liquid and the target substance; and treating the secondary fluid to reduce the proportion of the liquid relative to the target substance in the secondary fluid to form the work product. An apparatus for producing a work product including an intake conduit adapted to receive a first fluid, composed substantially of water, a sugar substance and residual substances, from a rinsing system for raisins or the like; a first processing station adapted to remove the residual substances from the first fluid to form a second fluid, composed substantially of water and the sugar substance; and a second processing station adapted to treat the second fluid by reverse osmosis, nanofiltration, or the like to reduce the proportion of water relative to the sugar substance in the second fluid to form the work product.

7 Claims, 2 Drawing Sheets

METHOD AND APPARATUS FOR PRODUCING A WORK PRODUCT

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates to a method and apparatus and, more particularly, to such a method and apparatus which are operable to produce a work product useable for a wide variety of applications in a wide variety of operative environments and having particular utility in processing fluids, which would otherwise be waste materials subject to disposal, for use devoted to a wide variety of useful purposes.

2. Description of the Prior Art

It is well known in industry and a variety of environments to attempt to use materials, which would otherwise be waste materials, for useful and otherwise valuable purposes. Where successful, such prior art processes provide both a means for disposing of, what would otherwise be, a waste material, as well as providing a useful product.

U.S. Pat. No. 2,830,603 to Vagim relates to a machine which employs water for the washing of raisins, recovers the washed raisins, but otherwise teaches only discharge of the water so used. In accordance with the disclosure of the patent, foreign matter is effectively separated from the raisins and retained in the tank of the machine for subsequent removal. The patent does not teach processing, or reuse, of the wash water.

The McGinness et al. U.S. Pat. No. 5,593,598 is directed to a "Method And Apparatus For Closed Loop Recycling Of Contaminated Cleaning Solution." In the practice of the invention, as disclosed in the subject patent, the treated cleaning solution is reused as the cleaning solution in the original cleaning process from which the contaminated cleaner was obtained. More specifically, the rinse water in the cleaning process becomes contaminated with dilute reused cleaning solution and is recycled by reverse osmosis to separate the rinse water and to reconcentrate the cleaning solution. The reconcentrated cleaning solution is returned to the original cleaning process for reuse and the reverse osmosis product water is returned to the original rinse station for reuse.

The foregoing McGinness et al. patent merely serves herein as an example of attempts in the prior art to employ an otherwise waste material for subsequent use. To the applicant's knowledge, however, there have heretofore been no successful prior art attempts to achieve the invention and the results thereof disclosed and claimed in the instant patent application in which a waste material is processed in such a manner as to produce, in effect, a new product useful for a variety of specific purposes with little, or no, substantial waste material of its own. The resulting savings in the cost of disposal of the otherwise waste material, the value in the marketplace of the new product and a host of other benefits would be of substantial value and significance where successfully achieved.

Therefore, it has long been recognized that it would be desirable to have a method and apparatus for producing a work product which permit an otherwise waste material to be converted for reuse; which produce a resultant product having a useful purpose in its own right; which produce a resultant product of independent commercial use and value; which produce a resultant product useful for a wide variety of purposes and a wide variety of different applications; and which are otherwise entirely successful in achieving their operational objectives.

BRIEF SUMMARY OF THE INVENTION

Therefore, it is an object of the present invention to provide an improved method and apparatus for producing a work product.

Another object is to provide such a method and apparatus which are operable to receive an otherwise waste material and convert such waste material for reuse.

Another object is to provide such a method and apparatus which are operable to produce a resultant product which is useful in its own right having a commercial value separate and apart from the original source and environment of use thereof.

Another object is to provide such a method and apparatus which are operable to produce a resultant product useful for a variety of specific purposes in a variety of operative environments.

Another object is to provide such a method and apparatus which have particular utility in processing fluids, such as water, used in rinsing, or washing, a work material, for the beneficial recovery and use of constituent substances therefrom.

Another object is to provide such a method and apparatus which are unusually well suited to the recovery of sugar substances and the like from waste fluids.

Another object is to provide such a method and apparatus which result in the production of a concentrate from waste materials which is readily adapted for use in the production of other commercial products.

Another object is to provide such a method and apparatus which are well suited to usage in conjunction with otherwise conventional methods and apparatuses without detracting from the conventional use thereof.

Another object is to provide such a method and apparatus which are unusually well adapted for use in converting raisin and other produce waste fluids to products which are independently useful.

Further objects and advantages are to provide improved elements and arrangements thereof in a method and apparatus for the purposes described which are dependable, economical, durable and fully effective in accomplishing their intended purposes.

These and other objects and advantages are achieved, in the preferred embodiment of the present invention, in a method and apparatus for producing a work product having the steps of receiving a first fluid composed of a liquid, a target substance and at least one residual substance; passing the first liquid through means for separating the residual substance from the first fluid to produce a secondary fluid substantially composed of the liquid and the target substance; and treating the secondary fluid to reduce the proportion of the liquid relative to the target substance in the secondary fluid to form the work product.

DETAILED DESCRIPTION OF THE INVENTION

Figure 1:
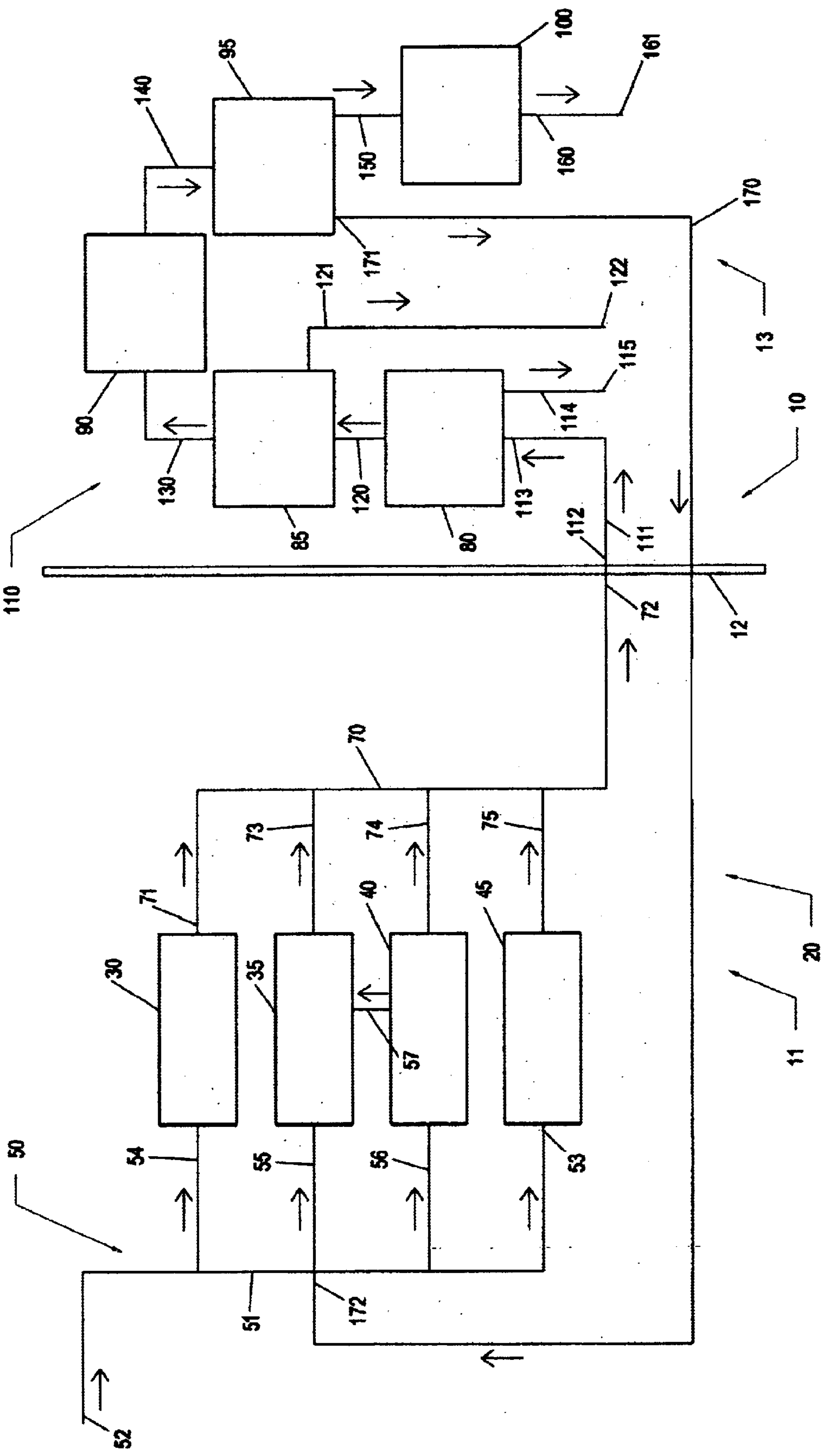
FIG. 1 is a schematic diagram of the method and apparatus for producing a work product of the present invention.
Figure 2:
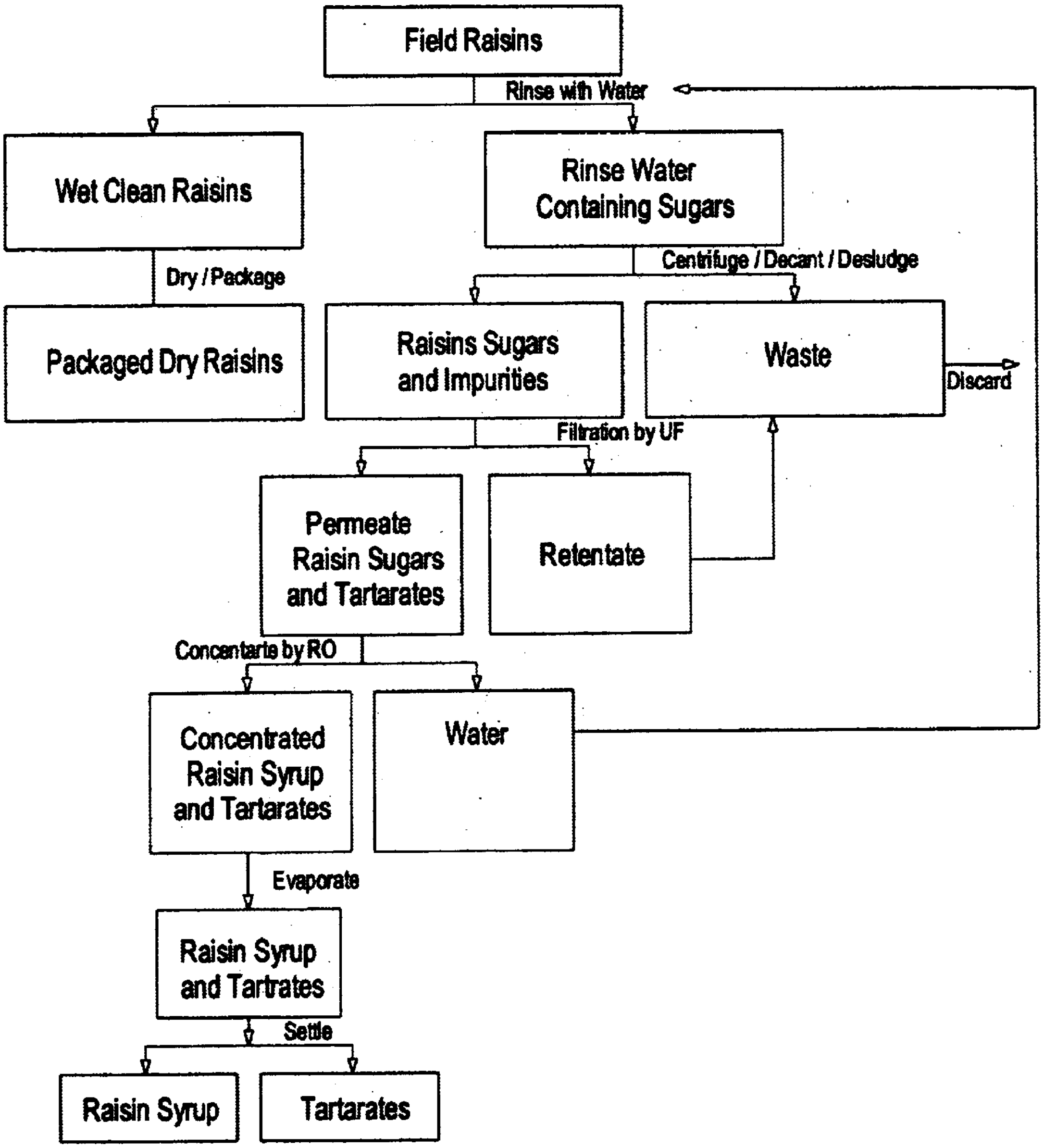
FIG. 2 is a schematic diagram of the method and apparatus for producing a work product of the present invention bearing legends indicating a typical sequence of operation in the practice thereof.

Referring more particularly to the drawing, the method and apparatus of the present invention are generally indicated by the numeral 10 in FIG. 1. As shown in FIG. 1, the method and apparatus of the present invention are shown in a typical environment of usage particularly well suited to the benefits of the invention and representative of a variety of operative environments in which the method and apparatus can be employed. More specifically, as shown in FIG. 1, a conventional washing or rinsing system 11 is generally indicated on the left in FIG. 1. A dividing wall is generally indicated by the numeral 12. More specifically, the method and apparatus for producing a work product of the present invention is generally indicated therein by the numeral 13.

Referring to the conventional washing or rinsing system 11, as will become apparent, the method and apparatus for producing a work product 13 of the present invention can be employed with a wide variety of types of systems, the one depicted in FIG. 1 and indicated by numeral 11 is merely representative of one such washing or rinsing system. Nonetheless, the method and apparatus of the present invention have particular utility and use in processing wash water discharged from a raisin processing plant or such a plant for other types of fruit bearing substances, such as sugar substances, or the like.

More particularly, the conventional rinsing system 11, in the illustrative embodiment, may best be visualized as being part of a raisin processing plant wherein the raisins, during processing, require processing to clean the raisins and remove dirt, trash, debris and any other deleterious materials from the raisins prior to other processing and packing. For the sake of clarity, it will be understood that the raisins can be formed by any desired means such as being naturally sun dried, dried by mechanical means or by any other process. In any case, it will be understood that, in the illustrative environment, the rinsing system 11 is an operational portion of a raisin processing plant of any desired type, but generally indicated by the numeral 20 in FIG. 1. It will further be understood that the raisin processing plant has a multiplicity of apparatuses including systems and subsystems for performing a variety of processes relative to the intake, processing and packing of the raisins. The conventional washing or rinsing system generally indicated by the numeral 11 in FIG. 1 constitutes only one of the multiplicity of systems of the plant and is shown and described herein only for purposes of disclosing the portion of the operative environment shown for illustrative convenience.

The rinsing system 11 employs a fresh water spray subsystem 30 which is operable, for example, to spray fresh water on loose raisins being transported along a conveyor, not shown. It will be understood that the fresh water spray subsystem operates at a particular work station, or within a particular zone, relative to the conveyor to apply the wash water to rinse the raisins passing therealong.

The rinsing system 11 has a wash tank subsystem 35. Typically, the wash tank subsystem consists of a tank into which the raisins are deposited and washed by any suitable means and from which they are transported for further processing.

The rinsing system 11 further includes a dewatering shaker 40 operable to receive raisins which have been washed and to shake, vibrate or otherwise apply motion to the raisins for the purpose of removing residual water therefrom.

The rinsing system 11 has a recleaner subsystem, or subsystems of recleaners, 45 operable again to rinse the raisins passing therealong by any suitable means, but, in the preferred embodiment, using water.

The rinsing system 11 further includes a water supply system generally indicated by the numeral 50. The water supply system includes a first conduit, or main supply line, 51 having an input end portion 52 connected to a source of fresh water, not shown, in fluid receiving relation and an opposite terminal end portion 53 connected in fluid supplying relation to the recleaner subsystem 45. A second conduit 54 interconnects the first conduit 51 and the fresh water spray subsystem 30 in fluid supplying relation. A third conduit 55 interconnects the first conduit 51 and the wash tank subsystem 35 in fluid supplying relation. A fourth conduit 56 interconnects the first conduit 51 and the dewatering shaker subsystem 40 in fluid supplying relation. A fifth conduit 57 interconnects the dewatering shaker subsystem 40 and the wash tank subsystem 35 in fluid supplying relation to the wash tank subsystem to recycle water thereto.

A sixth conduit 70 interconnects the fresh water spray subsystem 30 and has an input end portion 71 connected in fluid receiving relation to the fresh water spray subsystem 30 and an opposite terminal end portion 72 extending through the dividing wall 12. A seventh conduit 73 interconnects the wash tank subsystem 35 and the sixth conduit 70 in fluid discharging relation. An eighth conduit 74 interconnects the dewatering shaker subsystem 40 and the sixth conduit 70 in fluid discharging relation. A ninth conduit 75 interconnects the recleaner subsystem 45 and the sixth conduit 70 in fluid discharging relation.

The method and apparatus for producing a work product 13 of the present invention is generally to the right of the dividing wall 12, as shown in FIG. 1. As shown therein, the method and apparatus include a rotating screen subsystem 80. The rotating screen subsystem can be of any suitable type operable to receive, in the illustrative embodiment, water from the conventional washing or rinsing system 11, and to separate the solids therefrom, including both residual raisins, raisin fragments and the remaining deleterious materials, such as sand, trash and the like from the water.

The method and apparatus 13 further include a centrifuge subsystem 85 operable more completely to separate solids from the water received thereby from the rotating screen, as will hereinafter be described. Such solids typically may be sand, dirt and other substances borne by the water received therefrom.

The method and apparatus 13 further include an ultra filtration subsystem, or nanofiltration subsystem 90, of any suitable type which is operable to remove substantially all of the remaining particulate matter borne by water received thereby. This is accomplished by passage of the water through filtration systems, of any suitable type, thereby to reduce the water having passed therethrough essentially to water and the sugar substances.

The method and apparatus 13 further include a reverse osmosis subsystem 95 of any suitable type. The reverse osmosis subsystem operates to concentrate the soluble solids in the water received thereby so that the soluble solids are concentrated to a rating or grade of substantially about eight (8) to thirty (30) Brix.

The method and apparatus 13 have an evaporator subsystem 100, which may be of any suitable type. The evaporator subsystem is operable to receive, as will hereinafter be described in greater detail, the discharged water bearing concentrated sugar substances from the reverse osmosis subsystem 95 and further to process this water to remove water therefrom to the extent of increasing the sugar substance content of the water to forty (40) to eighty (80) Brix.

The method and apparatus 13 have a water supply system generally indicated by the numeral 110 in FIG. 1. The water supply system includes a first conduit 111 having an input end portion 112 connected in fluid receiving relation to the terminal end portion 72 of the sixth conduit 70 of the water supply system 50 of the rinsing system 11. The first conduit 111 has a terminal, or discharge, end portion 113 connected in fluid supplying relation to the rotating screen subsystem 80 of the method and apparatus 13, as shown in the right in FIG. 1. A discharge conduit 114 is connected in receiving relation to the rotating screen subsystem 80 for the receipt of solids therefrom such as residual raisins, raisin fragments, sand, trash and other residual materials. The discharge conduit 114 extends to a discharge end portion 115 which can, if desired, be connected to a suitable system for recovery of the materials for any desired purpose.

A second supply conduit 120 operably interconnects rotating screen subsystem 80 and centrifuge subsystem 85 in fluid supplying relation to the centrifuge subsystem. A second discharge conduit 121 is extended from the centrifuge subsystem 85 to a discharge end portion 122 through which the solids, such as remaining raisin fragments, sand, trash and the like, are discharged. If desired, these solids can be supplied to a system for recovering therefrom whatever may be desired.

A third supply conduit 130 interconnects the centrifuge subsystem 85 and the ultra filtration subsystem 90 in fluid supplying relation to the ultra filtration subsystem 90.

A fourth supply conduit 140 interconnects the ultra filtration subsystem 90 and the reverse osmosis subsystem 95 in fluid supplying relation to the reverse osmosis subsystem 95.

A fifth supply conduit 150 interconnects the reverse osmosis subsystem 95 and the evaporator subsystem 100 in fluid supplying relation to the evaporator subsystem 100.

A sixth supply conduit 160 interconnects the evaporator subsystem 100 and extends to a discharge end portion 161. The discharge end portion 161 can be connected by any suitable means to a source for recovering the discharge therefrom, as will hereinafter be described in greater detail.

A seventh supply conduit 170, having a receiving end portion 171 connected in receiving relation to the reverse osmosis subsystem 95, extends from the method and apparatus 13, through the dividing wall 12, and is connected at a discharge end portion 172 to the first conduit 51 of the water supply system 50 of the conventional washing or rinsing system 11. The seventh supply conduit is thus operable to return permeate resulting from the reverse osmosis subsystem 95 of the subject invention to the water supply system 50 of the conventional washing or rinsing system 11 for further processing.

In the illustrative embodiment, the method and apparatus of the present invention involve the collection of the discharge from the conventional washing or rinsing system 11, such as that of a raisin processing plant, wherein the discharged water is between one (1) and seven (7) Brix in sugar content. In accordance with the method and apparatus for producing a work product 13 of the present invention, the heavy solids are removed from the wash water by use of the rotating screen subsystem 80, the centrifuge subsystem 85, and the ultra filtration subsystem 90.

Subsequent to the removal of these solids from the wash water, the wash water is passed through the reverse osmosis subsystem, or nanofiltration system, 95 wherein the sugar substances borne by the water are increased to a rating or grade of eight (8) to thirty (30) Brix.

Thereafter, the evaporator subsystem 100 receives the processed water and evaporates water therefrom to increase the sugar substance content to a rating or grade of forty (40) to eighty (80) Brix. Thus the water discharged from the discharge end portion 161 of the sixth supply conduit 160 is substantially a sugar juice concentrate, or, in the illustrative embodiment, a raisin juice concentrate received for usage in any number of practical application. Examples of such usages are in making bakery, confectionery and dairy products, as well as for use in juice drinks, or in any area of application in which a concentrate consisting of a high percentage of sugar can be employed.

Several more specific examples of the practice of the method of the present invention follow.

EXAMPLE NO. 1

Two thousand gallons of water containing sugars and waste material is generated from washing and rinsing about six thousand pounds of raisins. This liquid contains about 2% to about 6% sugar solids (2° Brix to 6° Brix) leached from the raisins. The water containing field debris and raisin sugars are centrifuged, desluged or decanted to remove foreign material. In order to prevent undesirable fermentation, this liquid is heat treated at about 150° Fahrenheit (F.) to 180° Fahrenheit (F.) to deactivate any existing microorganisms. Heat treatment is done before or after centrifugation. It depends on the temperature of the water in which the raisins are washed, the time of the year, or the amount of holding time before and after centrifugation.

The supernatant from the centrifuge is then filtered by a PCI's (PCI Membrane Systems) crossflow membrane system equipped with a FP-200 membrane (Polyvinylidene Fluoride [PVDF] type or any other comparable membrane) at 5 to 50 gallons per minute (gpm), with the target of 15 gpm at 60° Fahrenheit (F.) to 180° Fahrenheit (F.) (target 160° Fahrenheit (F.) if initially not pasturized; otherwise about 100° Fahrenheit (F.)). To facilitate and extract as much sugar as possible, additional water at approximately 10% of the initial volume may be added during the prcedure. The molecular weight (MW) cut off for the membrane is about 5,000 MW to 500,000 MW, and preferably approximately 200,000 MW.

The permeate consists mostly of simple sugars with a composition of 5% to 35% glucose, 30% to 35% fructose and 1% to 3% sucrose. It has a pH value between 1 to 5, titratable acidity as tartaric between 0.5% to 3.5% and soluble solids, mostly simple sugars, at 2% to 6% (2° to 6° Brix). The permeate is commercially fermented to ethanol by an alcoholic fermentation, for example, by using *saccharomyces cerevisiae* or similar microorganisms.

$$C_6H_{12}O_6^{Sacch,\ Cerevisia}42C_2H_5OH+2CO_2$$

The retentate from the filtration contains very small pieces of insoluble suspended material which may be dried and used, for example as cattle feed.

EXAMPLE NO. 2

A sugar containing liquid is prepared from washing raisins following a procedure similar to that described in Example No. 1 except that the sugar solution is concentrated by a reverse osmosis (RO) unit at 5–50 gpm (15 gpm target). The RO membrane employed will have permeation from a 99% sodium chloride (NaCl) rejection (tightest) to 5,000 MW cut off (loosest). The preferred exclusion cut off point of the membrane is 50 MW to 2,000 MW. The permeate from RO is mostly water that can be utilized to wash raisins.

The desired operating pressure ranges from 50 pounds per square inch to 900 pounds per square inch.

The retentate consists mostly of simple sugars (glucose and fructose) at 12° Brix.

The purpose of water removal at this stage is to achieve economy of transportation and product stability.

EXAMPLE NO. 3

The permeate from either Example No. 1 (2% to 6% sugar solids) (2° Brix to 6° Brix), or retentate from Example No. 2 containing (7% to 30% sugars) (7° Brix to 30° Brix) are further processed to obtain a raisin/grape syrup. The sugar-water solution is further concentrated by heating and evaporating excessive water to obtain a syrup containing 40% to 80% sugar (40° Brix to 80° Brix). Evaporation was performed under 27 inches of vacuum. It is desirable to evaporate at a reduced pressure to retain product quality, mainly flavor and color. Evaporation temperature was 130° Fahrenheit (F.) and pressure preferably at 27 Hg inches of mercury.

After achieving the desirable sugar concentration of 70° Brix, the syrup was transferred into a holding tank and held at about 40° Fahrenheit (F.) to about 130° Fahrenheit (F.) for 1 to 10 days to allow most of the tartarates, mainly sodium potassium tartarate, to precipitate. The tartarate is removed by gravity from the tank and after further purification is sold for its leavening properties in bakeries. The raisin/grape syrup obtained has many applications, such as to replace cane sugar or corn syrup for products such as bakery items, jams, jellies, beverages, dairy products and the like.

Approximately between 1 ton and 1.5 tons of syrup at 70% sugar content (70° Brix) is obtained for every 100 tons of raisins processed. This process has not only economical advantage, but more importantly, it also has a very significant environmental impact.

Thus, it will be seen that the method and apparatus of the present invention are operable to convert an otherwise waste material in a wide variety of operative environments to a work product which has direct, practical applications of usage in a wide variety of environments substantially without the necessity for further processing of the work product.

Therefore, the method and apparatus for producing a work product of the present invention permit an otherwise waste material to be converted for reuse; produce a resultant product having a useful purpose in its own right; produce a resultant product of independent commercial use and value; produce a resultant product useful for a wide variety of purposes and a wide variety of different applications; and are otherwise entirely successful in achieving their operational objectives.

Although the invention has been herein shown and described in what is conceived to be the most practical and preferred embodiments, it is recognized that departures may be made therefrom within the scope of the invention which is not to be limited to the illustrative details disclosed.

Having described my invention, what I claim as new and desire to secure by letters patent is:

1. A method for producing a work product comprising the steps of: receiving a first fluid comprised substantially of water, a target substance which is substantially a sugar substance and at least one residual substance; passing said first fluid through means for separating said residual substance from the first fluid to produce a secondary fluid substantially composed of the first fluid and said sugar substance, and wherein said means for separating includes passing the first fluid through a rotating screen, a centrifuge and a filtration system; and treating said secondary fluid to reduce the proportion of the secondary fluid relative to the sugar substance, such treating of the secondary fluid being by reverse osmosis in the treating step to reduce the proportion of said water relative to said sugar substance and the secondary fluid is then treated in an evaporator to reduce the proportion of water therein to form said work product, as a concentrate of the sugar substance in said water, to form said work product having a sugar content of substantially about forty (40) to eighty (80) Brix, and wherein, in said receiving step, said first fluid is received from a rinsing system for raisins in which said raisins have been washed and substantially all of the raisins have been removed therefrom, in said passing step, the residual substance includes solids such as residual raisins, raisin fragments and waste materials, and, in said treating step, said work product is raisin juice concentrate.

2. The method of claim 1 wherein, in said treating step, reverse osmosis produces a permeate and including the step of returning said permeate to said rinsing system.

3. The method of claim 2 wherein, in said passing step, the rotating screen is used to remove the residual raisins and raisin fragments from the first fluid and the centrifuge is used to remove the waste materials from the first fluid.

4. The method of claim 3 wherein, in the treating step, reverse osmosis is employed to convert the secondary fluid to a sugar content of substantially about eight (8) to thirty (30) Brix prior to said treatment of the secondary fluid by the evaporator.

5. An apparatus for producing a sugar juice concentrate comprising an intake conduit adapted to receive a first fluid, composed substantially of water, a sugar substance and residual substances, from a rinsing system for raisins; a first processing station adapted to remove said residual substances from the first fluid to form a second fluid, composed substantially of water and a sugar substance; and a second processing station adapted to treat said second fluid by reverse osmosis or nanofiltration to reduce the proportion of water relative to said sugar substance in the second fluid to form said sugar juice concentrate.

6. The apparatus of claim 5 wherein said second processing station is operable to form said sugar juice concentrate having a sugar content of substantially about forty (40) to eighty (80) Brix.

7. A method for producing a work product consisting substantially of sugar juice concentrate comprising the steps of: receiving a first fluid from a rinsing system for raisins in which said raisins have been washed and substantially all of the raisins have been removed therefrom, the first fluid composed substantially of a liquid, a target substance and a residual substance including solids such as residual raisins, raisin fragments and waste materials; passing said first fluid through means for separating said residual substance from the first fluid to produce a secondary fluid substantially composed of the liquid and the target substance; and treating said secondary fluid to reduce the proportion of the liquid relative to said target substance in the secondary fluid to form said work product consisting substantially of sugar juice concentrate.

* * * * *